United States Patent
Murayama (10) Patent No.: US 10,872,051 B2
(45) Date of Patent: Dec. 22, 2020

(54) BUS CONTROL CIRCUIT (71) Applicant: CANON KABUSHIKI KAISHA, Tokyo (JP)

(72) Inventor: Kohei Murayama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/561,328

(22) Filed: Sep. 5, 2019

(65) Prior Publication Data
US 2020/0089635 A1 Mar. 19, 2020

(30) Foreign Application Priority Data

Sep. 18, 2018 (JP) .................................. 2018-174191

(51) Int. Cl.
*G06F 13/20* (2006.01)
*G06F 13/374* (2006.01)

(52) U.S. Cl.
CPC ............ *G06F 13/374* (2013.01); *G06F 13/20* (2013.01)

(58) Field of Classification Search
CPC .............................. G06F 13/374; G06F 13/20
See application file for complete search history.

(56) References Cited

U.S. PATENT DOCUMENTS

| | | | | |
|---|---|---|---|---|
| 5,887,134 A * | 3/1999 | Ebrahim | ........... | G06F 15/17331 709/200 |
| 6,243,829 B1 * | 6/2001 | Chan | ................... | G06F 11/2005 714/5.11 |
| 6,323,755 B1 * | 11/2001 | Lee | ..................... | G06F 13/4022 340/14.69 |
| 6,842,104 B1 * | 1/2005 | Osaka | ................. | G06F 13/4031 340/2.1 |
| 7,376,811 B2 * | 5/2008 | Kizhepat | ............. | G06F 15/7867 712/10 |
| 8,145,815 B2 | 3/2012 | Higuchi | | |

(Continued)

FOREIGN PATENT DOCUMENTS

JP 2010282405 A 12/2010
WO 2018100376 A1 6/2018

OTHER PUBLICATIONS

Extended European Search Report issued in European Appln. No. 19193097.3 dated Jan. 22, 2020.

*Primary Examiner* — Henry Tsai
*Assistant Examiner* — Christopher Daley
(74) *Attorney, Agent, or Firm* — Rossi, Kimms & McDowell LLP (57) ABSTRACT

A bus control circuit comprises an arbitration circuit which receives a bus-transfer request from each of a plurality of bus masters and outputs an arbitration result signal, in accordance with a priority order, to one of the bus masters, and a plurality of bus switches, wherein each bus switch comprises a selection circuit which includes a plurality of input terminals for receiving a plurality of bus transfer signals and an output terminal for transmitting one bus transfer signal to a downstream side, and a control circuit which receives the arbitration result signal from the arbitration circuit and controls the selection circuit based on the arbitration result signal to select one of the plurality of input terminals, and a slave module is connected to the output terminal of the selection circuit in the bus switch located at a most downstream position.

12 Claims, 8 Drawing Sheets

(56) References Cited

U.S. PATENT DOCUMENTS

| | | | |
|---|---|---|---|
| 8,819,323 B2* | 8/2014 | Nishiyashiki | G06F 13/36 710/242 |
| 8,874,680 B1* | 10/2014 | Das | H04L 67/2842 709/212 |
| 9,117,022 B1 | 8/2015 | Chiu | |
| 9,176,911 B2* | 11/2015 | Davis | G06F 13/28 |
| 2007/0073949 A1 | 3/2007 | Fredrickson | |
| 2008/0059674 A1 | 3/2008 | Shi | |
| 2012/0173924 A1* | 7/2012 | Xiao | G06F 11/1048 714/15 |
| 2012/0269452 A1* | 10/2012 | Naito | G06T 1/20 382/244 |
| 2016/0335210 A1* | 11/2016 | Yan | G06F 13/1673 |

* cited by examiner

| | ARBITRATION RESULT | SWITCH-1 PATH A | SWITCH-1 PATH B | SWITCH-1 FIFO | SWITCH-2 PATH A | SWITCH-2 PATH B | SWITCH-2 FIFO | SWITCH-3 PATH A | SWITCH-3 PATH B | SWITCH-3 FIFO |
|---|---|---|---|---|---|---|---|---|---|---|
| Cycle-0 | – | valid | valid | empty | – | – | empty | valid | valid | empty |
| Cycle-1 | Master-1 | valid | 1st | B | – | – | A | valid | valid | empty |
| Cycle-2 | Master-2 | valid | last | B-A | 1st | – | A-A | valid | valid | empty |
| Cycle-3 | Master-3 | 1st | valid | A | last | – | A-A-B | 1st | valid | A |
| Cycle-4 | Master-1 | last | valid | A-B | 1st | valid | A-B-A | 1st | valid | A |
| Cycle-5 | Master-4 | – | 1st | B | last | valid | A-B-A-B | last | valid | A-B |
| Cycle-6 | – | – | 1st | B | valid | 1st | B-A-B | – | valid | A-B |
| Cycle-7 | – | – | 1st | B | valid | last | B-A-B | valid | 1st | B |
| Cycle-8 | – | – | last | B | 1st | valid | A-B | valid | 1st | B |
| Cycle-9 | Master-3 | – | – | empty | last | valid | A-B-B | valid | 1st | B-A |
| Cycle-10 | – | – | – | empty | – | 1st | B-B | valid | last | B-A |
| Cycle-11 | – | – | – | empty | – | last | B-B | 1st | – | A |
| Cycle-12 | – | – | – | empty | – | 1st | B | last | – | A |
| Cycle-13 | – | – | – | empty | – | last | B | – | – | empty |
| Cycle-14 | – | – | – | empty | – | – | empty | – | – | empty |

BUS CONTROL CIRCUIT

BACKGROUND OF THE INVENTION

Field of the Invention

The present invention relates to a bus control circuit.

Description of the Related Art

In a hardware system including modules that control and operate the functions of a CPU and the system, the modules are connected to a slave module such as a main storage memory via a shared bus. For the operation of the system, a bus master module issues an access to the memory via the bus, thereby implementing the operation of the system. Such a hardware system is generally implemented on a semiconductor integrated circuit. Logic circuits that can be mounted on the semiconductor integrated circuit have remarkably improved along with the advance of the semiconductor technology, and accordingly, the scale of the systems is steadily increasing.

When the system scale increases in this way, the number of mountable functions increases, and accordingly, the number of bus master modules that access the main memory also increases.

If a plurality of bus master modules simultaneously issue access requests to a memory or the like, the accesses conflict on the shared bus. For this reason, the accesses are generally given priorities according to predetermined operation specifications defined by the system and arbitrated. In general, an arbitration circuit accepts access requests from bus masters, and selects a bus master to be access-permitted based on a predetermined condition defined based on the operation specifications. A bus switch selects one access from the accesses of the plurality of bus master modules based on the information of the bus master selected by the arbitration circuit. In general, the bus switch is configured as a logic circuit that selects a multi-bit signal representing an access attribute such as an address or a multi-bit signal such as access data.

As a bus system that forms connection between a plurality of bus master modules and a slave, there exists a bus system called a shared bus system that constitutes a bus system by a single arbitration circuit and a bus switch.

In the shared bus system, since a bus access is selected by the single arbitration circuit, bus transfer can be transmitted to a slave module based on a predetermined priority.

In this system, however, as the number of bus masters increases, multi-bit signals concentrate in the bus switch that selects one of the accesses of the plurality of bus master modules. This causes wiring congestion on the semiconductor integrated circuit, and the circuit scale becomes large. In addition, since the logic structure is configured to select one of the multi-bit bus signals of the plurality of bus master modules, the operating frequency is limited because the number of logic stages is large.

For example, if more than 200 bus master modules are implemented by a single bus switch, wiring concentration occurs in the entire bus system circuit. When the arrangement area is increased to avoid the wiring concentration, the circuit scale increases. On the other hand, when the arrangement area is increased for the logic for which timing convergence is difficult because of a large number of logic stages, the wiring delay becomes larger, and the operating frequency is limited. As a result, in a system including a large number of bus master modules because of recent multi-functionality, it is difficult to implement construction of a bus system using a single bus switch.

To cope with such a problem, in a large-scale system that handles many bus master modules, a hierarchical bus system in which bus switches are hierarchically arranged to form multiple stages, and access arbitration is performed between bus accesses connected to the bus switches is becoming common (for example, Japanese Patent Laid-Open No. 2010-282405).

In the hierarchical bus system, however, the bus switches are formed in multiple stages, and individual bus switches perform arbitration between accesses. For this reason, priority orders set for all masters and the priority orders of results of performing arbitration stepwise in the multiple stages may be different.

As a result, bus transfer for an access of low priority may sometimes be transmitted to the slave module before an access of high priority. On the other hand, since a plurality of processes or tasks conflict and operate in the large-scale system, it may sometimes be required to do implementation in accordance with the priority order of bus transfer to satisfy the performance of the entire system. In this case, in the hierarchical bus system, a logic that rearranges the access order of bus transfer to the access order in accordance with priority is needed between a bus master module and a slave module. The logic that rearranges the access order needs to hold a plurality of address commands and write data linked with them. In general, an address command includes an address signal, a master identification signal, a transfer direction signal, a transfer type signal, and the like, and is represented by a signal of about 40 bits. Additionally, depending on the bus width and the bus protocol, in a case of a 64-bit bus, write data is represented by a 72-bit signal including the data and byte enable information. Furthermore, for one address command, the data is represented by a plurality of 72-bit signals in accordance with the burst length of bus transfer. For example, if the burst length of bus transfer is 16 beats, signals of 1,152 bits are needed. Here, if the logic for rearranging the access order is configured to hold and rearrange four transfers, it is necessary to hold and rearrange signals of 4,768 bits, and a considerable circuit scale is consumed. In addition, since the rearrangement logic is a logic that compares conditions and selects wide data to be output, stage division to avoid wiring congestion and ensure the operating frequency is needed, resulting in an increase in the cost.

SUMMARY OF THE INVENTION

The present invention has been made in consideration of the above-described problem, and provides a bus control circuit capable of transmitting bus transfer to a slave module in accordance with a predetermined priority in a hierarchical bus method.

According to an aspect of the present invention, there is provided a bus control circuit configured to control connection of a bus between a plurality of bus masters and a slave module, comprising: an arbitration circuit configured to receive a bus-transfer request signal from each of the plurality of bus masters and output an arbitration result signal representing that a bus-use right is to be given, in accordance with a priority order set in advance, to one of the bus masters that have issued the bus-transfer request signals; and a plurality of bus switches, wherein each of the plurality of bus switches comprises: a selection circuit including a plurality of input terminals configured to receive a plurality of bus transfer signals, and an output terminal configured to transmit one bus transfer signal of the plurality of input terminals to a downstream side; and a control circuit configured to receive the arbitration result signal output from the arbitration circuit and control the selection circuit based on the arbitration result signal to select one of the plurality of input terminals, and the slave module is connected to the output terminal of the selection circuit included in the bus switch located at a most downstream position.

According to the present invention, it is possible to provide a bus control circuit capable of transmitting bus transfer to a slave module in accordance with a predetermined priority in a hierarchical bus method.

Further features of the present invention will become apparent from the following description of exemplary embodiments (with reference to the attached drawings).

DESCRIPTION OF THE EMBODIMENTS

The embodiments of the present invention will now be described in detail with reference to the accompanying drawings. Note that the arrangements according to the following embodiments are merely examples, and the present invention is not limited to the illustrated arrangements.

First Embodiment

Figure 1:
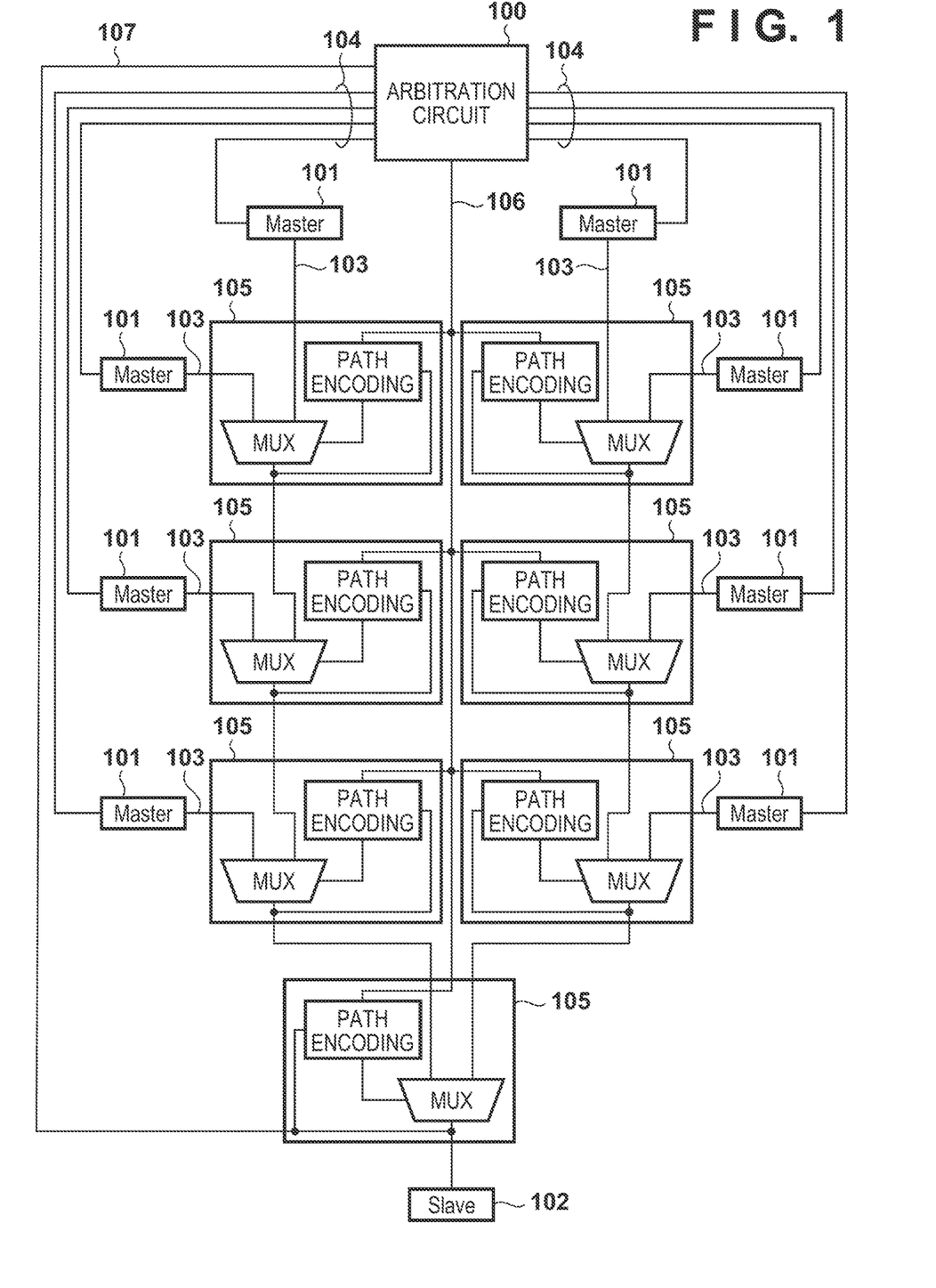
FIG. 1 is a block diagram showing the arrangement of a bus system according to the first embodiment.

FIG. 1 is a block diagram showing the arrangement of a bus system including a bus control circuit according to the first embodiment. The bus system shown in FIG. 1 is a system formed by eight bus master modules 101 and one slave module 102. It should be understood that the numbers of bus master modules and slave modules are not particularly limited and are merely examples.

Each bus master module 101 outputs a bus-transfer request signal 104 and a bus transfer signal 103. An arbitration circuit 100 collects the bus-transfer request signals 104 from the bus master modules 101. In addition, the arbitration circuit 100 arbitrates the bus-transfer requests in accordance with a condition set in advance, and decides one bus master module 101 that is a target to be given a bus access right from the bus master modules 101 that have output the bus-transfer requests.

The bus-transfer request signal 104 is a signal representing the presence/absence of a bus access request from each bus master module 101, and may include a transfer direction or priority information of the bus access in addition to the presence/absence of a bus access request.

The arbitration circuit 100 receives the bus-transfer request signal 104 from each bus master module 101, and decides one bus master module to be given a bus transfer permission. Then, to give the bus transfer permission to the decided bus master module, the arbitration circuit 100 outputs, as an arbitration result signal 106, bus master information representing the path from the corresponding bus master module to the slave module 102. The arbitration result signal 106 is transmitted to all bus switch circuits 105 that constitute the bus.

Note that in the embodiment, an example in which the number of bus masters is 8 is shown. Since one of them is connected to the slave module, three bits suffice to specify one bus master. Hence, the arbitration result signal 106 output from the arbitration circuit 100 can be represented by a signal line of bits in a number as small as three.

The path from the bus master module 101 to the slave module 102 is connected via the bus switch circuit 105, and the bus transfer signal 103 of each bus master module 101 is input to the corresponding bus switch circuit 105.

The bus transfer signal 103 includes command information such as the address information and the transfer direction of the bus access and bus transfer identification information. Additionally, in a case of write to the slave module 102, the bus transfer signal 103 includes data to be written in addition to the command information.

The bus switch circuit 105 is a switch circuit that receives a plurality of bus transfer signals 103, selects one of them, and transmits the signal to the output bus. The bus switch circuit 105 according to this embodiment is configured to receive two bus transfer signals 103 and output one of them. The arrangement of the bus switch circuit 105 will be described below.

Figure 2:
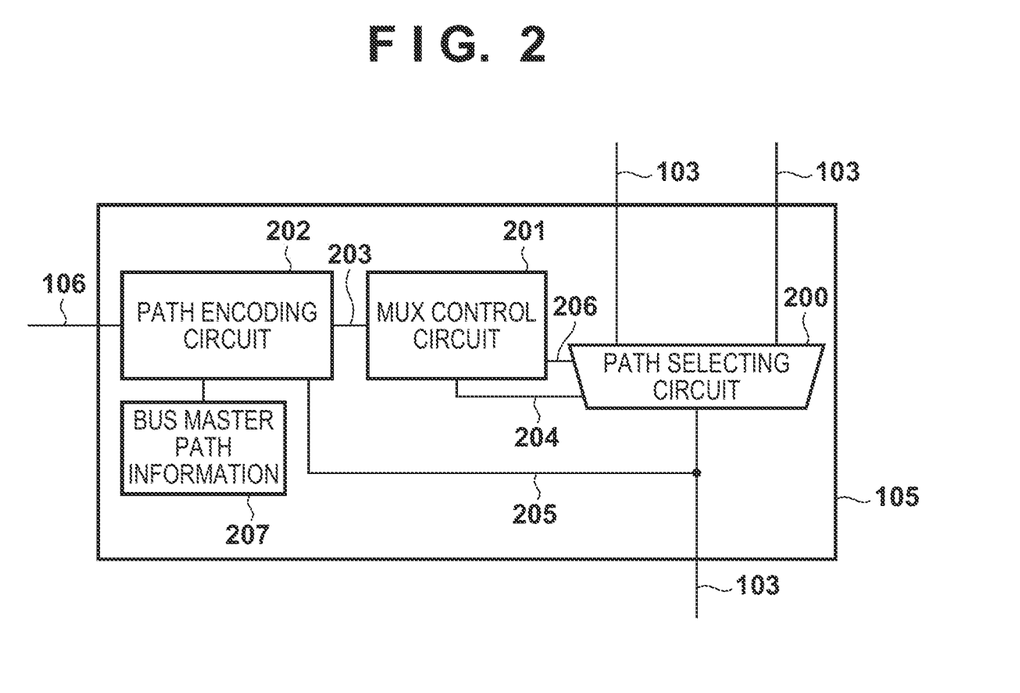
FIG. 2 is a block diagram showing the arrangement of a bus switch circuit according to the first embodiment.

FIG. 2 is a block diagram showing the arrangement of one bus switch circuit 105. The arbitration result signal 106 that is notified as the information of the bus master module given a transfer permission by the arbitration circuit 100 is input to a path encoding circuit 202. Based on the received arbitration result signal 106, the path encoding circuit 202 determines whether bus transfer of the bus master module is to be performed via the bus switch circuit 105. The path encoding circuit 202 holds bus master path information 207 representing which bus master module 101 should perform transfer for each of the two bus transfer signals 103 input to the bus switch circuit 105 as bus configuration information. The bus master path information 207 is stored in, for example, a memory such as a ROM or a register file.

In a case of transfer via the bus switch circuit 105, the path encoding circuit 202 encodes information representing which input terminal of a path selecting circuit 200 should be selected, and notifies an MUX control circuit 201 of it as path selection information 203. In a case of bus transfer without the intervention of the bus switch circuit 105, the path encoding circuit 202 does not perform processing responding to the arbitration result signal 106, and does not make a notification to the MUX control circuit 201.

The MUX control circuit 201 generates the bus master path information 207 in accordance with the notification of the path selection information 203 from the path encoding circuit 202. In this example, since the path selecting circuit 200 is a selecting circuit including two input terminals and one output terminal, the path selection information 203 is 1-bit information.

When notified of the path selection information 203 from the path encoding circuit 202, the MUX control circuit 201 generates and outputs, as the switching information of the switch, a switching selection signal 204 used to select one of the two input bus transfer signals 103. In addition, the MUX control circuit 201 outputs bus master path status information 206 representing the presence/absence of a valid switching selection signal 204.

Figure 6:
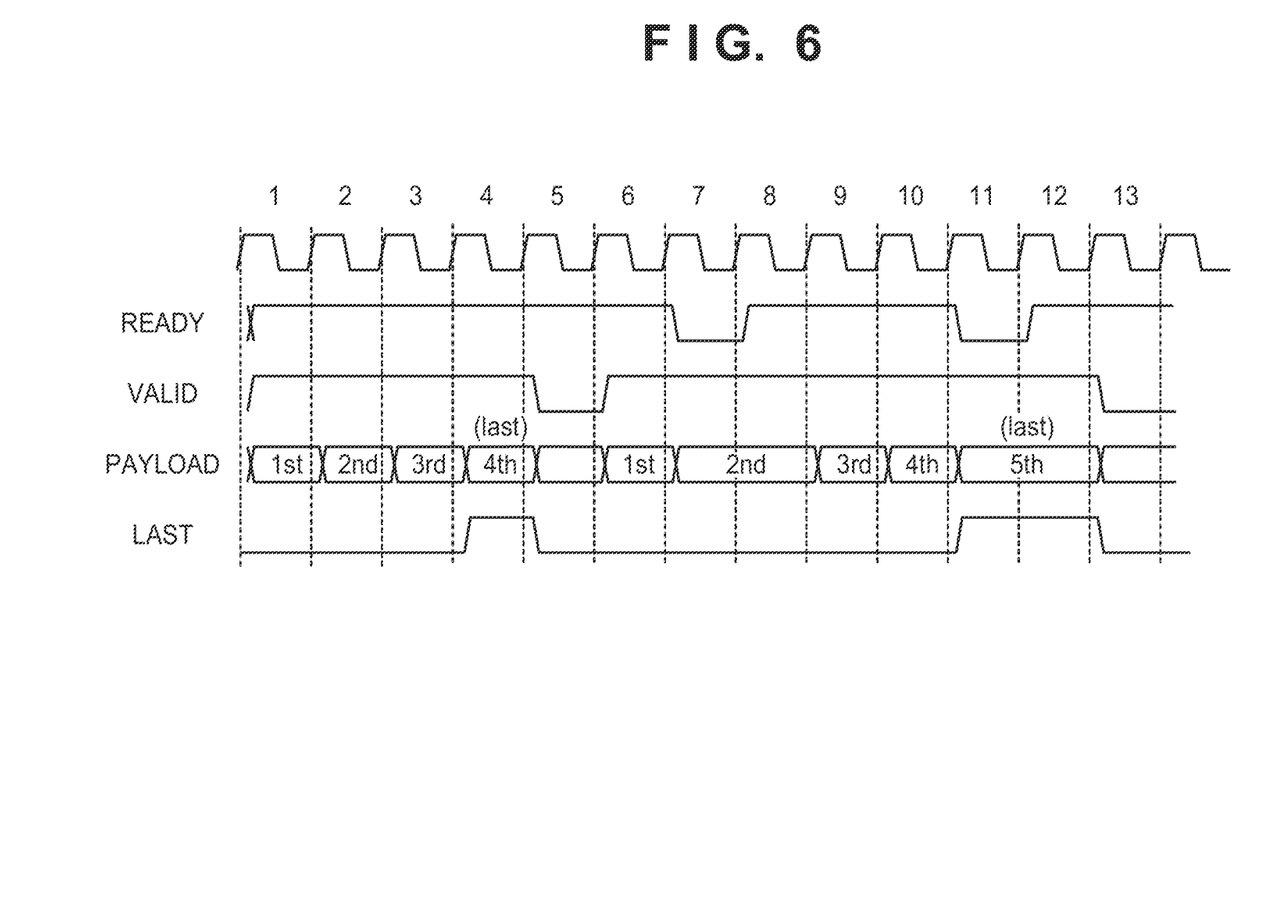
FIG. 6 is a timing chart showing an example of signal waveforms of bus transfer according to an embodiment.

The path encoding circuit 202 further receives a flag signal 205 (to be referred to as a final transfer flag signal hereinafter) representing final bus transfer by the bus transfer signal 103 output to the downstream side, and output of the switching selection signal 204 and the bus master path status information 206 of the transfer is stopped in accordance with the issuance of the final transfer flag signal 205. The final transfer flag signal 205 is a flag signal representing final transfer of bus transfer associated with the bus-transfer request issued by the bus master module 101. Generation of the flag signal is arbitrary. For example, as indicated by waveforms shown in FIG. 6, in transfer by a two-line handshake in which the bus transfer signals 103 are VALID and READY, a flag signal representing the final cycle of the payload of bus transfer may be implemented. The example shown in FIG. 6 indicates two bus transfers. The first series of bus transfer is bus transfer of four cycles, and the second bus transfer is bus transfer of five cycles. A LAST signal is issued in each of the transfer of the fourth cycle and the transfer of the fifth cycle, which are final payload transfers, thereby showing the final cycle of a series of bus transfer. Here, a method of explicitly giving a flag representing final transfer in bus transfer is shown. However, for example, transfer length data information may be provided in a payload, and a flag signal can be generated by referring to the information. In a case of bus transfer using a fixed transfer length, a flag signal may be generated at a fixed cycle interval.

The bus switch circuit 105 at the most downstream position, which is directly connected to the slave module 102, will be described. The slave module 102 notifies the arbitration circuit 100 of the flag signal 205 representing final transfer as a transfer end flag signal 107. After the output of the arbitration result signal 106, the arbitration circuit 100 waits for reception of the transfer end flag signal 107 and outputs the arbitration result of the next bus access. The path selecting circuit 200 controls to output (or pass) one of the two bus transfer signals 103 based on the value represented by the switching selection signal 204. In addition, the path selecting circuit 200 includes the input of the path status information 206 that is the status of path selection information. If valid path selection information is not present in the path status information 206, the path selecting circuit 200 controls not to output either of the bus transfer signals 103 of the two inputs. That is, in a state in which no valid bus path selection information is input, the path selecting circuit 200 is controlled not to transmit the information of the bus transfer signal 103 from the upstream side to the downstream side.

When the bus switch circuit 105 is thus configured, the path of bus transfer to the slave module 102 can be formed in the order of bus master modules 101 decided by the arbitration circuit 100 to acquire a bus-use right, and bus transfer can be implemented.

Second Embodiment

Figure 3:
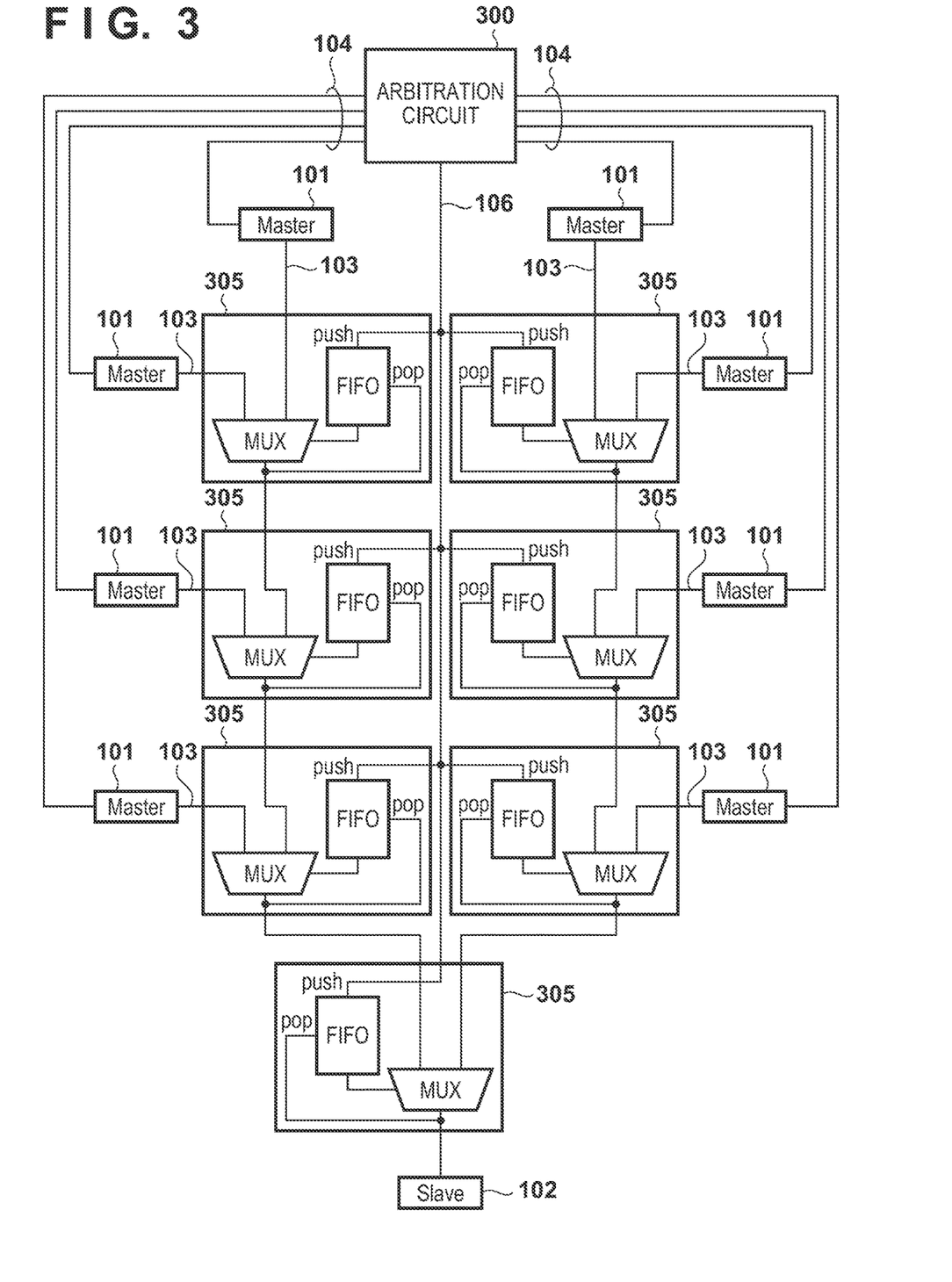
FIG. 3 is a block diagram showing the arrangement of a bus system according to the second embodiment.

FIG. 3 is a block diagram showing the arrangement of a bus system according to the second embodiment. The bus system shown in FIG. 3 is a system formed by eight bus master modules 101 and one slave module 102. The bus master module 101 outputs a bus-transfer request signal 104 and a bus transfer signal 103.

An arbitration circuit 300 responds to a bus-transfer request from the bus master module 101, arbitrates a plurality of bus-transfer requests in accordance with a condition set in advance, and decides one bus master module to be given a bus access right. In addition, the arbitration circuit 300 collects the bus-transfer request signals 104 from the bus master modules 101.

The bus-transfer request signal 104 is a signal representing the presence/absence of a bus access request issued by the bus master module 101, and may include a transfer direction or priority information of the bus access in addition to the presence/absence of a bus access request.

The arbitration circuit 300 receives the bus-transfer request from each bus master module 101, decides one bus master module to be given a bus transfer permission, and outputs bus master information to be given the bus transfer permission as an arbitration result signal 106. The arbitration result signal 106 is transmitted to all bus switch circuits 305 that constitute the bus.

The path from the bus master module 101 to the slave module 102 is connected via the bus switch circuit 305, and the bus transfer signal 103 of each bus master module 101 is input to the bus switch circuit 305.

The bus transfer signal 103 includes command information such as the address information and the transfer direction of the bus access and bus transfer identification information. Additionally, in a case of write to the slave module 102, the bus transfer signal 103 includes data to be written. In this embodiment, an arrangement including command information and write data is shown. However, an arrangement in which command information and write data are separated as bus transfer signals is also possible.

The bus switch circuit 305 is a switch circuit that receives a plurality of bus transfer signals 103, selects one of them, and transmits the signal to the output bus. In this embodiment, an arrangement of an input bus for two bus transfer signals 103 is shown. The arrangement of the bus switch circuit 305 will be described below.

Figure 4:
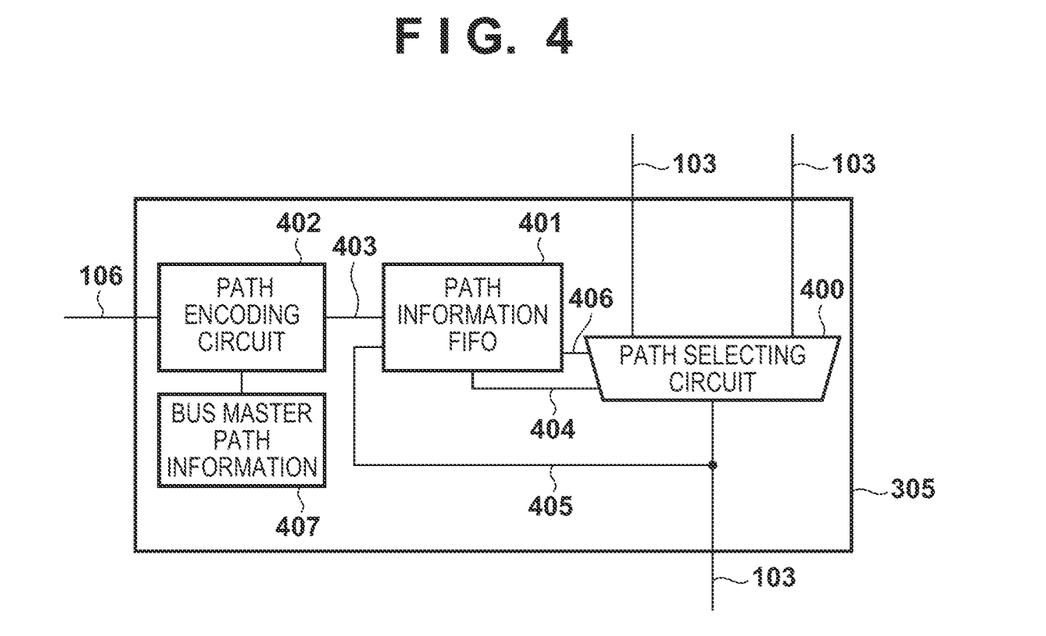
FIG. 4 is a block diagram showing the arrangement of a bus switch circuit according to the second embodiment.

FIG. 4 is a block diagram showing the arrangement of one bus switch circuit 305 according to the second embodiment. The arbitration result signal 106 that is notified as the information of the bus master module given a transfer permission by the arbitration circuit 300 is input to a path encoding circuit 402. The path encoding circuit 402 determines whether bus transfer of the bus master module is to be performed via the bus switch circuit 305. For this reason, the path encoding circuit 402 holds bus master path information 407 used to determine which bus master module 101 should perform transfer for each of the two bus transfer signals 103 input to the bus switch circuit 305.

In a case of transfer via the bus switch circuit 305, the path encoding circuit 402 encodes information representing which bus transfer signal 103 the input should be selected from, and notifies a path information FIFO 401 of it as path selection information 403. In a case of bus transfer without the intervention of the bus switch circuit 305, the path encoding circuit 402 does not perform processing responding to the arbitration result signal 106, and does not make a notification to the path information FIFO 401.

Figure 5:
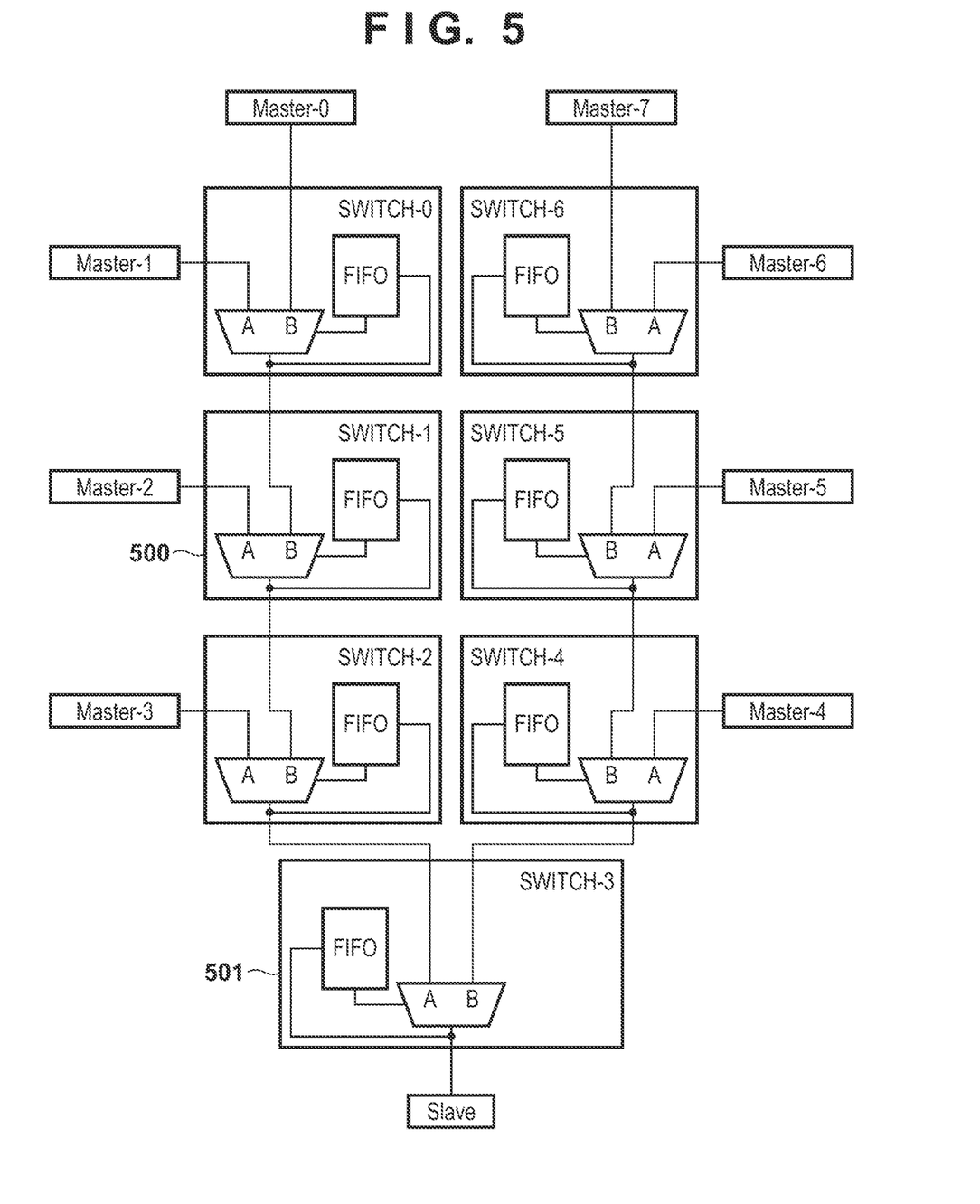
FIG. 5 is a schematic block diagram showing the arrangement of the bus system according to the second embodiment.

FIG. 5 identifiably shows the individual bus master modules 101 and the bus switch circuits 305 shown in FIG. 3, and identifiably shows the paths of the path selection logics of the individual bus switch circuits 305. The operation of the bus switch circuit 305 will be described below with reference to FIG. 5.

"Switch-1 (500)" that is a switch circuit connected to "Master-2" as one of the bus master modules will be described. Hence, note that a path selecting circuit 400 and the like to be described below are circuits in switch-1 (500). In a case in which the information of the bus master module permitted to transfer is Master-0 or Master-1, the path encoding circuit 402 determines that it is transfer via switch-1 (500). The path encoding circuit 402 determines that the bus transfer is transfer from a path B, and notifies the path information FIFO 401 of the information as the path selection information 403. In a case in which the information of the bus master module permitted to transfer is Master-2 as well, the path encoding circuit 402 determines that it is transfer via switch-1 (500). The path encoding circuit 402 determines that the bus transfer is transfer from a path A, and notifies the path information FIFO 401 of the information as the path selection information 403. On the other hand, in a case in which the information of the bus master module permitted to transfer is one of Master-3 to Master-7, the path encoding circuit 402 determines that it is transfer without the intervention of switch-1 (500), and operates not to make a notification of the path selection information 203.

Switch-3 (501) that is a switch circuit directly connected to the slave module 102 will be described. As for switch-3, in a case in which the information of the bus master module permitted to transfer is any one of Master-0 to Master-7, the path encoding circuit 402 determines that it is transfer via switch-3 (501). That is, a condition to determine that it is transfer without the intervention of switch-3 (501) does not exist. In a case in which the information of the bus master module permitted to transfer is one of Master-0 to Master-3, the path encoding circuit 402 determines that the bus transfer is transfer from the path A, and notifies the path information FIFO 401 of the information as the path selection information 403. On the other hand, in a case in which the information of the bus master module permitted to transfer is one of Master-4 to Master-7, the path encoding circuit 402 determines that the bus transfer is transfer from the path B, and notifies the path information FIFO 401 of the information as the path selection information 403.

The path information FIFO 401 is configured to hold the selection information of the path selecting circuit 400 in the FIFO form. The path selection information 403 notified by the path encoding circuit 402 is registered in the FIFO. In this example, since the path selecting circuit 400 is a 2-input selecting circuit, the path selection information 403 is 1-bit information, and the path information FIFO 401 is constituted as a 1-bit FIFO.

When notified of the path selection information 403 from the path encoding circuit 402, the path information FIFO 401 registers the path selection information 403 in the FIFO. The path information FIFO 401 further includes the input of a flag signal 405 representing final bus transfer by the bus transfer signal 403 output to the downstream side, and operates to delete an entry registered earliest from the FIFO by the issuance of the final transfer flag signal 405. The final transfer flag signal 405 is a flag signal representing final transfer of bus transfer associated with the bus-transfer request issued by the bus master module 101. Generation of the flag signal is arbitrary. As in the first embodiment, for example, as indicated by waveforms shown in FIG. 6, in transfer by a two-line handshake in which the bus transfer signals 103 are VALID and READY, a flag signal representing the final cycle of the payload of bus transfer may be implemented.

The path information FIFO 401 outputs path selection information held at the start of the FIFO as a switching selection signal 404 of the path selecting circuit 400. The path selecting circuit 400 controls to output one of the bus transfer signals 103 of the two inputs based on the value represented by the switching selection signal 404. The path information FIFO 401 thus operates to hold the switching order information of the switch.

In addition, the path selecting circuit 400 includes the input of FIFO status information 406 that is the status of path selection information held in the path information FIFO 401. If a valid entry of path selection information held in the FIFO is not present in the FIFO status information 406, the path selecting circuit 400 controls not to output either of the bus transfer signals 103 of the two inputs. That is, if the entry of the path information FIFO 401 is empty, control is performed not to transmit the information of the bus transfer signal 103 from the upstream side to the downstream side.

When the bus switch circuit 305 is thus configured, the path of bus transfer to the slave module 102 can be formed in the order of bus master modules 101 decided by the arbitration circuit 300 to acquire a bus-use right, and bus transfer can be implemented.

Figure 7:
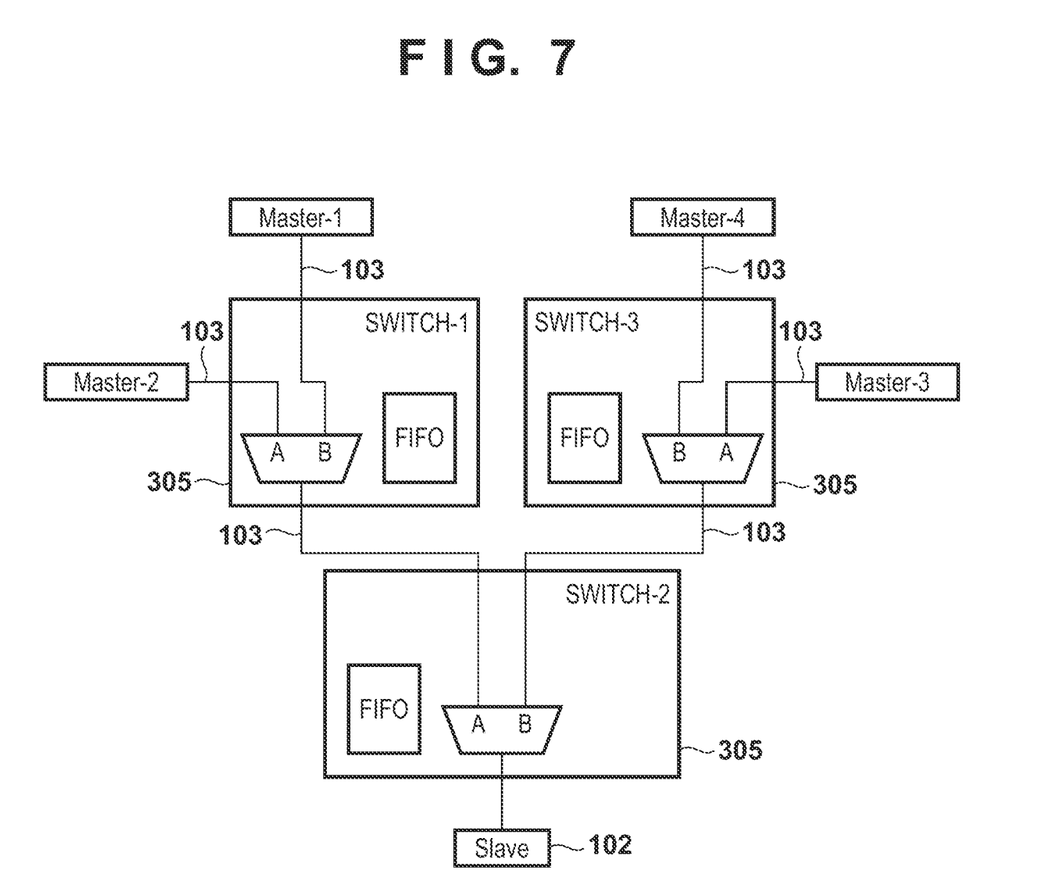
FIG. 7 is a block diagram showing the arrangement of the bus system so as to explain the effect of the second embodiment.
Figure 8:
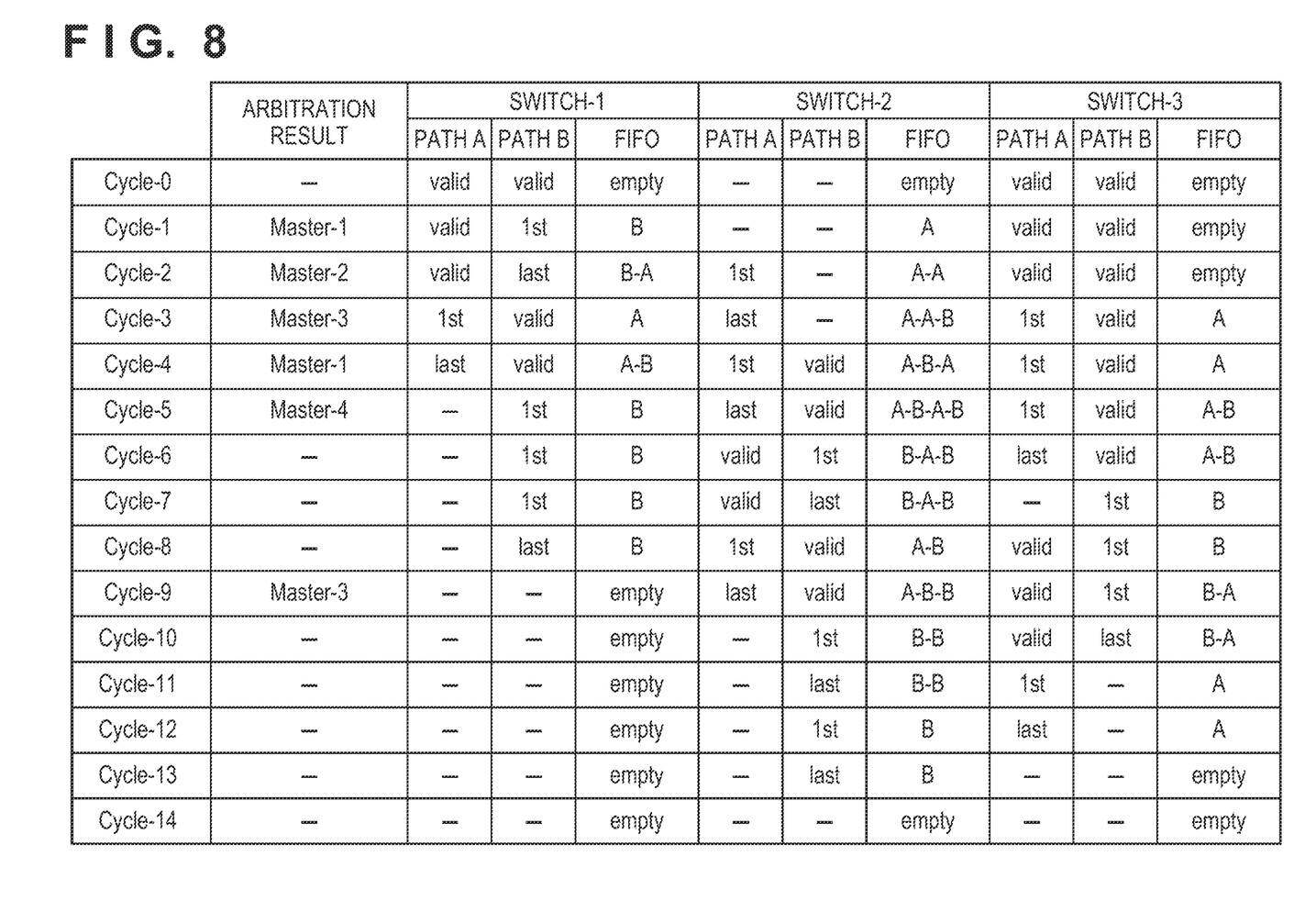
FIG. 8 is an explanatory view of the states of bus switches in each cycle in the explanation of the effect in FIG. 7.

The behavior of the entire bus will be described next using the bus configuration of the four bus master modules 101 shown in FIG. 7. FIG. 8 shows the states of the bus transfer signals 103 in three bus switch circuits 305 that constitute the bus of each cycle and the state of the path information FIFO 401. Additionally, in this example, for the sake of simplicity, a description will be made assuming that each bus transfer is transfer in two cycles. In Cycle-0, four bus master modules issue bus-transfer requests, and the arbitration circuit 300 does not issue the arbitration result signal 106 yet. This is a state in which each bus master module issues the bus transfer signal 103 to the downstream side. This state is represented as "valid" in FIG. 8". The paths A and B of switch-1 and switch-3 are "valid". The path information FIFO 401 of each bus switch is empty, and therefore, each bus switch does not issue the bus transfer signal 103 to the downstream side. Hence, the paths A and B of switch-2 are in a state "-" in which bus transfer is not issued.

In this example, the arbitration circuit 300 is assumed to give the bus-use right in the order of Master-1, Master-2, and Master-3 in response to the bus-transfer requests from the bus master modules 101. Master-1 issues the next bus-transfer request when or before the bus transfer of its own ends, and the bus-use right is given to Master-1 before Master-4. Furthermore, it is assumed that Master-3 issues the bus-transfer request in Cycle-8, and the arbitration circuit (100) operates to give the bus-use right to Master-3 in Cycle-9.

When the arbitration circuit 300 gives the bus-use right to Master-1 in Cycle-1, the information of the path B is registered in the path information FIFO 401 of switch-1, and the information of the path A is registered in the path information FIFO 401 of switch-2. As for switch-3, since Master-1 given the bus-use right is not associated with the switch, no path information is registered in the path information FIFO 401, and the empty state of the FIFO continues. In switch-1, since the information is registered in the path information FIFO 401, the path selecting circuit 400 operates to select the path B, and the first transfer of Master-1 of the path B input to switch-1 is output to switch-2. Since the information is registered in the path information FIFO 401 of switch-2 as well, the path selecting circuit 400 operates to select the path A. However, before the bus transfer from switch-1 is input, valid bus transfer is not issued to the downstream side.

When the arbitration circuit 300 gives the bus-use right to Master-2 in Cycle-2, the information of the path A is registered in the path information FIFO 401 of switch-1, and the information of the path A is registered in the path information FIFO 401 of switch-2. In switch-1, the final transfer of Master-1 is transmitted from the path B, and the path of the path selecting circuit 400 is not switched. On the other hand, switch-2 transfers the first transfer of Master-1 transferred from switch-1 via the path A to the slave module 102 on the downstream side.

When the arbitration circuit 300 gives the bus-use right to Master-3 in Cycle-3, the information of the path A is registered in the path information FIFO 401 of switch-3, and the information of the path B is registered in the path information FIFO 401 of switch-2. As for switch-1, since Master-3 given the bus-use right is not associated with the switch, no information is registered in the path information FIFO 401. However, since the final transfer of Master-1 via the path B is transferred in Cycle-2, the oldest entry of the path B in the FIFO is deleted, the switching selection signal 404 indicates the path A, and the path of the path selecting circuit 400 is changed. In switch-3, since the information is registered in the path information FIFO 401, the path selecting circuit 400 operates to select the path A, and the first transfer of Master-3 of the path A input to switch-3 is output to switch-2. In switch-2, the final transfer of Master-1 is transferred to the slave.

When the arbitration circuit 300 gives the bus-use right to Master-1 in Cycle-4, the information of path B is registered in the path information FIFO 401 of switch-1, and the information of the path A is registered in the path information FIFO 401 of switch-2. In switch-2, since the final transfer of Master-1 via the path A is transferred in Cycle-3, the oldest entry of the path A in the FIFO is deleted. Although the entry of the path information FIFO 401 is deleted, since the next entry of the switching selection signal 404 is the path A, the switch of the path selecting circuit 400 continuously selects the path A and the first transfer of Master-2 is transferred to the slave module 102.

When the arbitration circuit 300 gives the bus-use right to Master-4 in Cycle-5, the information of path B is registered in the path information FIFO 401 of switch-3, and the information of the path B is registered in the path information FIFO 401 of switch-2. As for switch-1, since Master-4 given the bus-use right is not associated with the switch, no information is registered in the path information FIFO 401. However, since the final transfer of Master-2 via the path A is transferred in Cycle-4, the oldest entry of the path A in the FIFO is deleted, the switching selection signal 404 indicates the path B, and the path of the path selecting circuit 400 is changed. In Cycle-5, in switch-2, the final transfer of Master-2 via the path A is transferred to the slave module 102.

In Cycle-6, the oldest entry in the path information FIFO 401 is deleted, the path of the path selecting circuit 400 is changed to the path B, and the transfer is switched to transfer via switch-3. From then on, similarly, when the transfer of Master-3 is completed, switch-2 is switched to the path A in Cycle-8, and the transfer of Master-1 is transferred to the slave module. When the arbitration circuit 300 newly gives the bus-use right to Master-3 in Cycle-9, the information of the path A is registered in the path information FIFO 401 of switch-3, and the information of the path B is registered in the path information FIFO 401 of switch-2. When the final transfer of Master-1 is completed in Cycle-9, the operation is performed such that bus transfer of Master-4 is transferred to the slave module 102 from Cycle-10, and bus transfer of Master-3 is transferred to the slave module 102 from Cycle-12.

As described in the above embodiment, in the bus system that forms the path from the bus master module to the slave module via the plurality of bus switch circuits 305, bus transfer can be issued in the order of bus-use right giving by the arbitration circuit using a simple selection logic. In particular, when the number of inputs of the path selecting circuit 400 is decreased, it is possible to constitute a bus system capable of forming path selection of the entire bus by the FIFO of a small number of bits and controlling a desired bus transfer priority order with low cost.

Additionally, although not explicitly explained in this embodiment, the arbitration circuit 300 can also refer to the state of the path information FIFO 401 of each bus switch circuit 305 and control the timing to give the bus-use right. More specifically, the arbitration circuit 300 can refer to the empty state of the FIFO entry of the path information FIFO 401 and, if the FIFO entry is not empty, wait bus-use right giving until the FIFO entry becomes empty.

Additionally, the above-described example shows an arrangement that transmits bus-use right giving information that is the arbitration result from the arbitration circuit 300 to the bus switch circuit 305. In this embodiment, if the entry of the path information FIFO 401 does not exists, the bus switch circuit 305 controls not to issue bus transfer to the downstream side via the path selecting circuit 400. Hence, the bus master module 101 may issue bus transfer via the bus transfer signal 103 after the bus-transfer request is issued. On the other hand, the arbitration circuit 300 may transmit the bus-use right giving information that is the arbitration result to the bus master module 101. When the arrangement that transmits the bus-use right giving information to the bus master module is employed, the issuance of the bus transfer signal 103 from the bus master module 101 can be controlled after the acceptance of the bus-use right giving information. Accordingly, the path selecting circuit 400 need not perform control in a case of absence of the entry of the path information FIFO 401.

Modifications of Embodiments

In the first and second embodiments, an arrangement that transmits address information and data information via the same path in the path from the bus master module to the bus slave module is shown. However, an arrangement that independently transmits address information and data information can also be applied. That is, a form in which an address information bus and a data information bus are independently constituted can be applied. In this arrangement, the bus master module 101 notifies the arbitration circuit 100 (or 300) of bus transfer direction information together with the bus-transfer request signal 104. The arbitration circuit 100 (or 300) transmits the bus transfer direction information of the transfer to the bus switch circuit 105 (or 305) together with the arbitration result signal 106. In the bus switch circuit, a bus switch that transmits address information and a bus switch that transmits data information are independently constituted. The bus switch that transmits data information is implemented by referring to the bus transfer direction information transmitted together with the arbitration result signal 106 and, only in a case of write transfer, converting the information into the path information of the bus switch.

In the first and second embodiments, an arrangement that all bus switch circuits 105 (or 305) that constitute the bus system are notified of the arbitration result signal 106 issued by the arbitration circuit 100 (or 300) at once is shown. On the other hand, the arbitration result signal 106 may be notified to only some of the bus switch circuits 105 (or 305). For example, in the arrangement shown in FIG. 5, the notification of the arbitration result signal 106 of the bus access right from Master-0 to Master-3 may be made only from switch-0 to switch-3.

In the first and second embodiments, a switch circuit arrangement in which the bus switch circuit 105 (or 305) includes two input buses is shown. However, three or more input buses may be provided. In this case, the switching selection signal 204 (or 404) for the bus switch is represented by a signal of two or more bits.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-174191, filed Sep. 18, 2018 which is hereby incorporated by reference herein in its entirety.

What is claimed is:

1. A bus control circuit configured to control connection of a bus between a plurality of bus masters and a slave module, the circuit comprising:
   an arbitration circuit configured to receive a bus-transfer request signal from each of the plurality of bus masters and output an arbitration result signal representing that a bus-use right is to be given, in accordance with a priority order set in advance, to one of the bus masters that have issued the bus-transfer request signals; and
   a plurality of bus switches,
   wherein each of the plurality of bus switches comprises:
   a selection circuit including a plurality of input terminals configured to receive a plurality of bus transfer signals, respectively, and an output terminal configured to transmit one bus transfer signal of the received plurality of bus transfer signals to a downstream side; and
   a control circuit configured to receive the arbitration result signal output from the arbitration circuit and control the selection circuit based on the arbitration result signal to select the one bus transfer signal of the received plurality of bus transfer signals to be transmitted from the output terminal of the selection circuit to the downstream side,
   wherein the slave module is connected to the output terminal of the selection circuit included in the bus switch of the plurality of bus switches that is located at a most downstream position of the plurality of bus switches, and
   wherein the plurality of input terminals in the bus switch located at the most downstream position respectively receive the plurality of bus transfer signals from the output terminals of bus switches of the plurality of bus switches.

2. The circuit according to claim 1, wherein the control circuit includes a memory configured to convert the arbitration result signal into path information of the bus switch and hold the path information as a switching selection signal.

3. The circuit according to claim 2, wherein the memory included in the control circuit holds the switching selection signal in a FIFO form.

4. The circuit according to claim 2, wherein the control circuit determines whether the bus transfer signal is transferred via each of the plurality of bus switches, and converts the arbitration result signal into the path information of the bus switch.

5. The circuit according to claim 4, wherein upon determining that the bus transfer signal is transferred without an intervention of each of the plurality of bus switches, the control circuit does not perform processing responding to the arbitration result signal.

6. The circuit according to claim 2, wherein the path information is 1-bit information.

7. The circuit according to claim 1, wherein the bus switch includes a switch configured to transmit address information bus, and a switch configured to transmit data information bus.

8. The circuit according to claim 1, wherein the arbitration circuit further receives information representing a bus transfer direction from each of the plurality of bus masters together with the bus-transfer request signal, and outputs the information representing the bus transfer direction from the bus master decided to be given a bus-use right together with the arbitration result signal.

9. The circuit according to claim 8, wherein the control circuit includes a memory configured to convert the arbitration result signal and the information representing the bus transfer direction into path information of the bus switch and hold the path information as the switching selection signal.

10. The circuit according to claim 1, wherein the plurality of input terminals in each of the plurality of bus switches receive the plurality of bus transfer signals from at least one of the output terminals of the remaining bus switches and the plurality of bus masters.

11. A bus control circuit configured to control connection of a bus between a plurality of bus masters and a slave module, the circuit comprising:
    an arbitration circuit configured to receive a bus-transfer request signal and information representing a bus transfer direction from each of the plurality of bus masters and output the information representing the bus transfer direction from the bus master decided to be given a bus-use right together with an arbitration result signal representing that the bus-use right is to be given, in accordance with a priority order set in advance, to one of the bus masters that have issued the bus-transfer request signals; and
    a plurality of bus switches,
    wherein each of the plurality of bus switches comprises:
    a selection circuit including a plurality of input terminals configured to receive a plurality of bus transfer signals, respectively, and an output terminal configured to transmit one bus transfer signal of the received plurality of bus transfer signals to a downstream side; and
    a control circuit configured to receive the arbitration result signal and the information representing the bus transfer direction output from the arbitration circuit, convert the arbitration result signal and the information representing the bus transfer direction into path information of the bus switch, hold the path information in a memory as a switching selection signal and control the selection circuit based on the switching selection signal to select the one bus transfer signal of the received plurality of bus transfer signals to be transmitted from the output terminal of the selection circuit to the downstream side,
    wherein the slave module is connected to the output terminal of the selection circuit included in the bus switch of the plurality of bus switches that is located at a most downstream position of the plurality of bus switches.

12. A bus control circuit configured to control connection of a bus between a plurality of bus masters and a slave module, the circuit comprising:
- an arbitration circuit configured to receive a bus-transfer request signal from each of the plurality of bus masters and output an arbitration result signal representing that a bus-use right is to be given, in accordance with a priority order set in advance, to one of the bus masters that have issued the bus-transfer request signals; and
- a plurality of bus switches,
- wherein each of the plurality of bus switches comprises:
- a selection circuit including a plurality of input terminals configured to receive a plurality of bus transfer signals, respectively, and an output terminal configured to transmit one bus transfer signal of the received plurality of bus transfer signals to a downstream side; and
- a control circuit configured to receive the arbitration result signal output from the arbitration circuit, determine whether a bus transfer signal is transferred via each of the plurality of bus switches, convert the arbitration result signal into path information of the bus switch, hold the path information in a memory as a switching selection signal and control the selection circuit based on the arbitration result signal to select the one bus transfer signal of the received plurality of bus transfer signals to be transmitted from the output terminal of the selection circuit to the downstream side,
- wherein the slave module is connected to the output terminal of the selection circuit included in the bus switch of the plurality of bus switches that is located at a most downstream position of the plurality of bus switches, and
- wherein upon determining that the bus transfer signal is transferred without an intervention of each of the plurality of bus switches, the control circuit does not perform processing responding to the arbitration result signal.

\* \* \* \* \*